United States Patent [19]

Jarret, deceased et al.

[11] Patent Number: 4,725,048

[45] Date of Patent: Feb. 16, 1988

[54] DAMPED ELASTIC STOP DEVICE

[75] Inventors: Jean Jarret, deceased, late of Paris, by Catherine Suzanne Jarret; Jacques Jarret, Louveciennes, both of France

[73] Assignee: Societe d'Exploitation des Ressorts Auto-Amortisseurs Jarret, Paris, France

[21] Appl. No.: 880,883

[22] Filed: Jul. 1, 1986

[30] Foreign Application Priority Data

Jul. 5, 1985 [FR] France .................. 85 10357

[51] Int. Cl.⁴ ............................................. F16M 7/00
[52] U.S. Cl. .................................. 267/140.4; 188/268; 188/381
[58] Field of Search .............. 267/140.3, 140.4, 140.5, 267/151; 188/381, 268; 403/291, 209, 206, 226

[56] References Cited

U.S. PATENT DOCUMENTS

| | | | |
|---|---|---|---|
| 2,854,718 | 10/1958 | Viola | 403/291 X |
| 3,031,034 | 4/1962 | Thomas | 188/381 |
| 3,034,597 | 5/1962 | Arnold et al. | 188/381 |
| 3,596,737 | 8/1971 | Volk | 188/268 |

*Primary Examiner*—Joseph Falk
*Attorney, Agent, or Firm*—Staas & Halsey

[57] ABSTRACT

This invention relates to a damped elastic stop device, associated with two parts mobile with respect to each other in a determined direction. One part bears two circular bosses, over the periphery of which pass two loops of yarn or cable made of fibers of polyamide or aramid resin, attached to a central block connected to the other part. The device acts both as a spring, thanks to the elasticity of the yarn of the loops, and as a damper, thanks to the friction of the yarn of the loops sliding on the periphery of the bosses.

11 Claims, 4 Drawing Figures

DAMPED ELASTIC STOP DEVICE

BACKGROUND OF THE INVENTION

The present invention relates to a damped elastic stop device, constituting a self-damping spring which presents progressive mechanical reactions corresponding to the algebraic sum of elastic reactions and of frictions, this device being adapted to control the relative displacements of two parts mobile with respect to each other in a determined direction.

Materials, generally thermo-plastics (non-metallic), such as polyamide or aramid resins, in the form of yarns or cables, are known to be industrially produced, which present remarkable properties of mechanical strength and elasticity, and are therefore capable, for a loss mass of material, of accumulating and restoring a large quantity of mechanical energy, provided that this energy is supplied in the form of traction forces for a duration which is as short as the stress is high.

SUMMARY OF THE INVENTION

It is an object of the present invention to take advantage of the existence of these materials in order to make very light elastic stops, by adopting arrangements which make it possible to dissipate a considerable part of the mechanical energy absorbed in the form of heat resulting from frictions.

The present invention therefore relates to a damped elastic stop device which comprises two identical loops of yarn contained in planes parallel to the direction of relative displacement of the two parts mentioned above, these planes being very close or merged in the same plane, and disposed symmetrically with respect to an axis parallel to said direction; the yarn of each loop, attached by its ends to one of the mobile parts, passes around a boss connected to the other part of which it may slide with friction, whilst said yarn is made of a material offering a high tensile strength and a considerable capacity of elastic elongation, preferably of fibers of synthetic polyamide or aramid resin ("Nylon", "KEVLAR i.e.,", etc . . . ).

"Yarn" is understood in the present specification to mean both a single-strand (monofilament) yarn and a multi-stand cabled yarn or cable.

More precisely, the elements constituting the device according to the invention should be geometrically dimensioned so that, when the mobile parts move from a relative rest position, the yarn of each loop undergoes a progressive elongation, and that part of the yarn in direct or indirect contact with the boss slides on the peripheral surface thereof.

In such a device, when the parts with which it is associated move in reciprocal movement, the mechanical energy is accumulated by the elastic elongation of the yarns forming the two said loops, whilst damping of the movement of the parts is obtained by the friction of the two yarns moving on the periphery of the bosses.

In general, each boss presents a circular peripheral contour, the latter preferably comprising a groove which receives the yarn of the corresponding loop.

Furthermore, the yarn of each loop may, at least in its median portion in contact with the boss, be covered with a friction sheath which protects it from rapid wear.

Each loop is advantageously provided with a device for adjusting the tension of the yarn, making it possible to meter the degree of initial pre-stress thereof.

In a first embodiment, the ends for attachment of the loops may be provided to be closer to the axis of symmetry than the bosses. Inversely, in a second embodiment, said ends are more remote from the axis of symmetry than the bosses. The latter are in that case preferably superposed, their contours coinciding at least approximately. More precisely, the two superposed bosses may constitute a single disc comprising for the two loops two respective circular grooves disposed side by side and centred on the axis of the disc.

A device according to the invention as defined hereinabove constitutes a double-effect damped elastic stop capable of allowing and limiting the relative displacements of two mechanical parts, to and fro in a determined direction.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENTS

Figure 1:
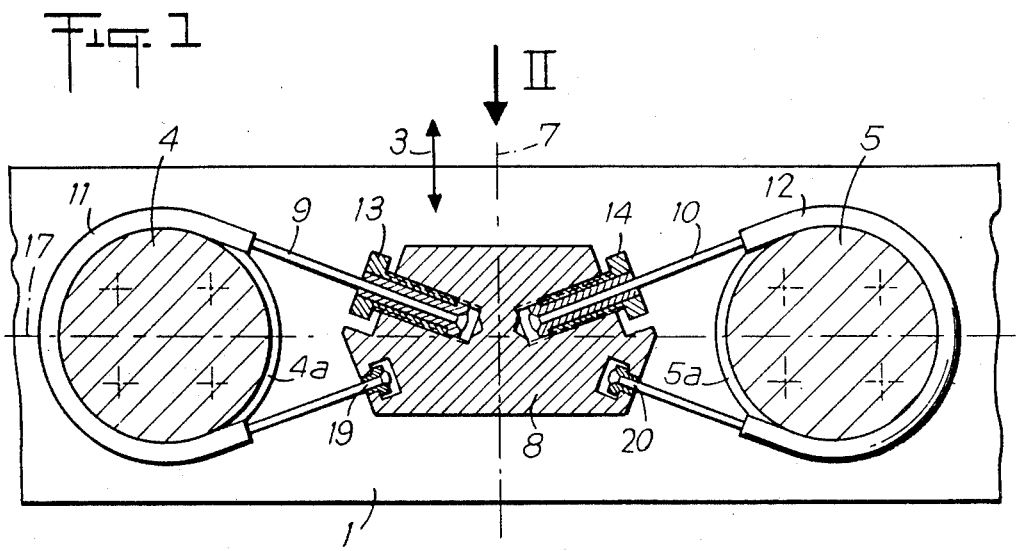
FIG. 1 shows a damped stop device according to the invention, in section along line I-I of Fig. 2.
Figure 2:
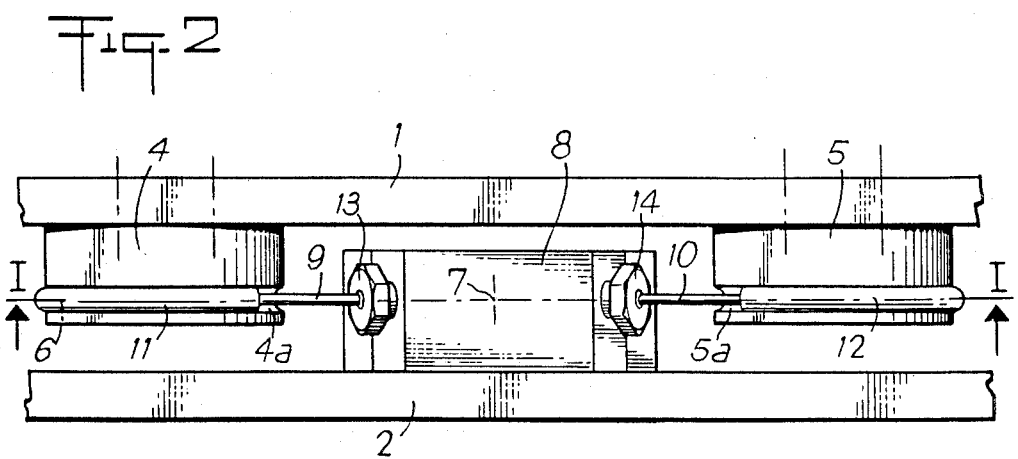
FIG. 2 shows the device of FIG. 1 seen in the direction of arrow II.

Referring now to the drawings, FIGS. 1 and 2 firstly show two parts 1, 2 capable of moving with respect to each other in a determined direction of translation 3. To part 1 are fixed two identical metallic bosses 4, 5 presenting on their periphery circular grooves 4a, 5a of the same diameter, which lie in the same plane 6 parallel to direction 3, symmetrically with respect to an axis 7 parallel to this direction and contained in said plane. To part 2 there is fixed a block 8 disposed between the bosses 4, 5 at an equal distance therefrom.

Block 8 is connected to each of bosses 4, 5 by a respective loop of yarn 9, 10, each end of which is attached to said block and passes around the corresponding boss in the peripheral groove thereof, with which it is in contact via a friction sheath 11, 12. The two loops lie in plane 6, symmetrically with respect to axis 7. Each is, at one end 19, 20, simply anchored in block 8 and, at its other end, attached thereto by a device 13, 14 for adjusting its length and its tension at rest.

Loops 9, 10 are composed of yarn or cable of synthetic resin fibers of the polyamide or aramid type, such "Nylon" or "KEVLAR", capable of supporting high mechanical stresses in traction, with a considerable elastic elongation and without appreciable permanent deformation if the effort is of short duration. As for the protective friction sheaths 11, 12, they may be made of supple plastics material or rubber material. In addition, friction pads (not shown) made of plastics material or metal, may be interposed between the sheathes and the slide grooves 4a, 5a of the bosses 4, 5, which, on moving with the sheaths, avoid abnormal wear of the latter. In any case, the grooves 4a, 5a should present, as shown, a cross section in the form of an arc of circle, so as exactly to contain the respective sheaths 11, 12 for protecting the yarns forming loops 9, 10.

In neutral position (the position shown in FIG. 1), the four rectilinear arms of the two loops 9, 10 are subjected to equal forces, possibly weak or even zero, resulting from the initial adjustment of tension. When an outer force causes the displacement of part 2 downwardly with respect to part 1 (following the representation of FIG. 1), the total length of each loop increases, the length of the two upper arms increasing more quickly as the length of the two lower arms is reduced. This involves a slide of the sheathed median part of each loop in the corresponding grooves 4a, 5a of the bosses 4, 5.

The forces exerted on the upper arms, on the one hand, and the forces exerted on the lower arms, on the other hand, are composed to create an overall resultant force which opposes the downward displacement of part 2. This resultant force increases with the stroke in very progressive manner, the unitary elastic reaction being substantially zero at the start to become considerable when the total length of each loop considerably increases, as the displacement moves the two mechanical parts 1 and 2 away from their initial position.

The friction forces in grooves 4a, 5a also increase with the traction forces exerted on the arms of the loops, but their resultant is added to the elastic forces when parts 1, 2 move away from each other, whilst it opposes the elastic forces when said parts move closer to each other. This results in a damping effect, adjustable by the choice of the initial tension, which very rapidly reduces the amplitude of the periodic oscillations caused by the elastic reactions exerted between parts 1, 2.

Figure 3:
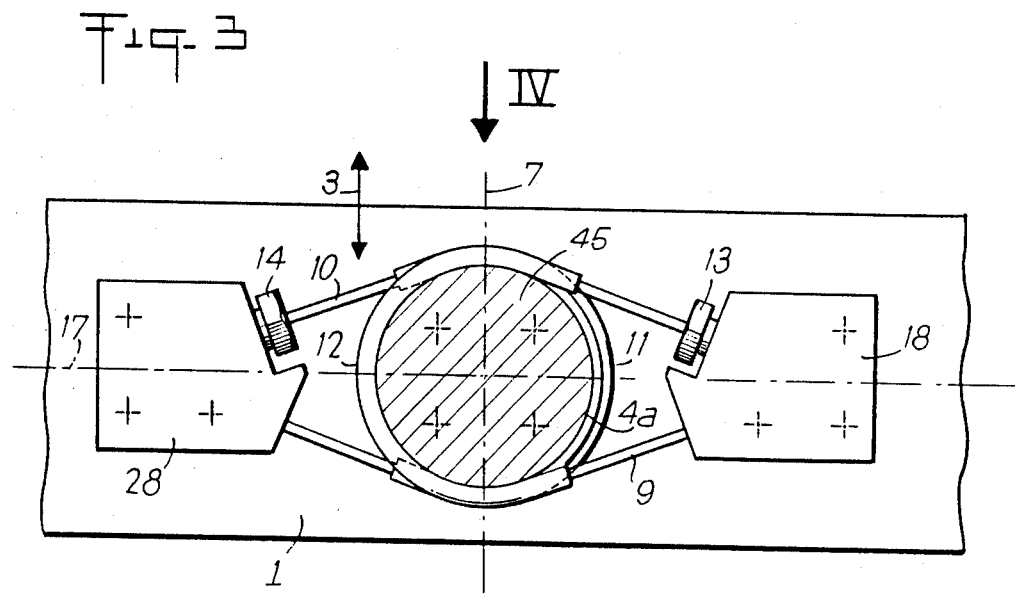
FIGS. 3 and 4 show an alternate embodiment in views similar to FIGS. 1 and 2.
Figure 4:
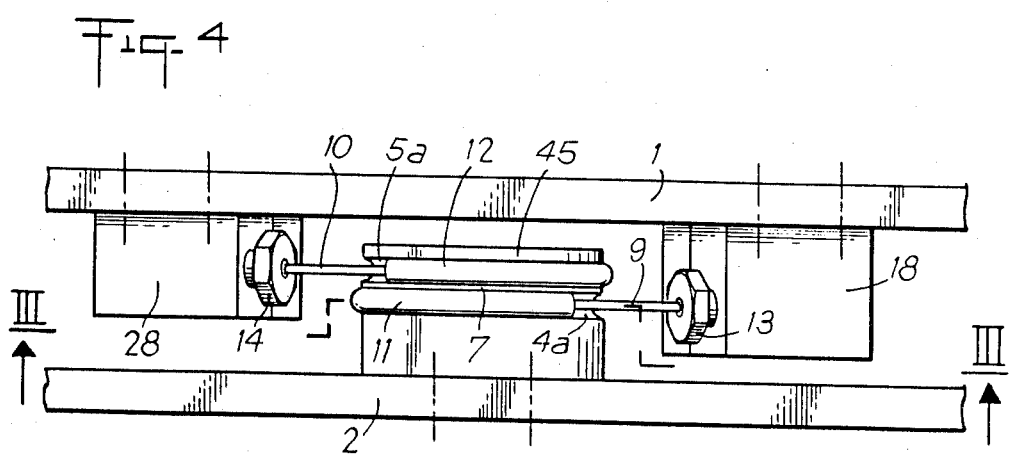

In an alternate embodiment where the arrangement of the elements is reversed (FIGS. 3 and 4), grooves 4a, 5a for receiving loops 9, 10 are grouped side by side on the same disc 45 fixed to part 2, whilst two blocks 18, 28 are fixed to part 1 symmetrically on either side of disc 45. The loop of yarn 9 passes over groove 4a and its ends are attached to block 18, whilst loop 18 passes over groove 5a, it ends being attached to the other block 28. Here too, said loops are provided with tension adjusting devices 13, 14. The arrangement is likewise symmetrical with respect to axis 7, with the sole difference, without practical consequence, that the loops of yarn are no longer in the same plane 6, but, as shown in FIG. 4, are in two very close parallel planes, located on either side of axis 7.

This latter device operates in exactly the same manner as the device of FIGS. 1 and 2.

As the devices described present, in their initial position of rest as shown, a symmetry likewise with respect to an axis 17 parallel to the planar loops and perpendicular to the direction 3 of displacement of parts 1, 2, it is clear that they are capable of damping, then of limiting by stop effect the displacements of said parts both in one direction and in the opposite direction, and in the same manner. These are therefore double-effect devices of which each, apart from its damping properties, is equivalent to a pair of conventional end-of-stroke stops. In addition, it appears that these same devices ensure a relative positioning along axis 17 of parts 1, 2 with which they are associated.

Such double-effect damped stop devices are particularly advantageously used for completing the suspension of land vehicles, by limiting the clearance of the wheels with respect to the body frame, ensuring the lateral or longitudinal positioning of the body frame with respect to the non-suspended mechanical parts, and possible replacing the shock absorbers generally interposed between the suspended part and the non-suspended part of the vehicle.

What is claimed is:

1. A damped elastic stop device for controlling the relative displacements of first and second parts movable with respect to each other, comprising:
   first and second identical loops of yarn contained in at least one plane parallel to the direction of relative displacements of the first and second parts, and disposed symmetrically with respect to an axis parallel to said direction,
   wherein the yarn of each loop includes two ends, is attached by the two ends to one of the first and second movable parts, and passes around rigid boss means fixedly connected to the other first and second part on which a portion of the yarn contacting the boss means may slide with friction, and
   wherein said yarn is made of a material of high tensile strength and a high capacity for elastic elongation.

2. The device of claim 1, wherein the yarn of the loops is composed of fibers selected from the group consisting essentially of synthetic polyamide and aramid resin.

3. The device of claim 1, wherein, when the first and second parts move from a relative rest position, the yarn of each loop undergoes a progressive elongation, and that portion of each yarn contacting the boss means slides on a peripheral surface of the boss means.

4. The device of claim 1, wherein the boss means has a circular periphery.

5. The device of claim 1, wherein the boss means comprises a groove which receives the yarn.

6. The device of claim 1, wherein the yarn of each loop is, at least in a median portion thereof, in contact with the boss means and covered with a protective friction sheath.

7. The device of claim 1, wherein each loop is provided with a device for adjusting the tension of the yarn.

8. The device of claim 1, wherein the ends of each loop for attachment of the loops are closer to the axis of symmetry than the boss means.

9. The device of claim 1, wherein the ends of each loop for attachment of the loops are more remote from the axis of symmetry than the boss means.

10. The device of claim 9, wherein the boss means is two bosses superposed, the periphery of each substantially coinciding.

11. The device of claim 9, wherein the boss means is a single disc comprising, for the tow loops, two respective circular grooves disposed side by side and centered on the axis of the disc.

* * * * *